US012469993B2

(12) United States Patent
Li et al.

(10) Patent No.: US 12,469,993 B2
(45) Date of Patent: Nov. 11, 2025

(54) CARD EDGE CONNECTOR INCLUDING A FLIPPED PIN FOOT ORIENTATION

(71) Applicant: Intel Corporation, Santa Clara, CA (US)

(72) Inventors: Xiang Li, Portland, OR (US); Shaohua Li, Pleasanton, CA (US); Kai Xiao, Portland, OR (US); Mo Liu, Santa Clara, CA (US); Jingbo Li, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 757 days.

(21) Appl. No.: 17/483,913

(22) Filed: Sep. 24, 2021

(65) Prior Publication Data

US 2022/0021139 A1 Jan. 20, 2022

(51) Int. Cl.
*H01R 12/73* (2011.01)
*H01R 12/57* (2011.01)
*H01R 12/72* (2011.01)

(52) U.S. Cl.
CPC ........... *H01R 12/57* (2013.01); *H01R 12/721* (2013.01); *H01R 12/737* (2013.01)

(58) Field of Classification Search
CPC ..... H01R 12/57; H01R 12/721; H01R 12/737
See application file for complete search history.

(56) References Cited

U.S. PATENT DOCUMENTS 5,872,051 A 2/1999 Fallon et al.
6,431,889 B1 8/2002 Olson
(Continued)

FOREIGN PATENT DOCUMENTS

EP 0926779 A1 3/2004
EP 1306928 A1 1/2006
(Continued)

OTHER PUBLICATIONS

European Patent Office, Communication Pursuant to Article 94(3) EPC dated Apr. 25, 2024 in European Patent Application No. 22156716.7 (5 pages).
(Continued)

*Primary Examiner* — Vanessa Girardi
(74) *Attorney, Agent, or Firm* — Schwabe, Williamson & Wyatt, P.C.

(57) ABSTRACT

In one embodiment, a card edge connector includes a housing including a slot to receive a first circuit board. A first plurality of pins extend from within the slot through a bottom of the housing. Each of the first plurality of pins includes a first end to mate with a corresponding contact of the first circuit board and a second end to mate with a corresponding one of a first plurality of contacts of a second circuit board, the second end including a heel portion and a toe portion extending from the heel portion in a direction away from a centerline of the slot. A second plurality of pins extend from within the slot through the bottom of the housing. Each of the second plurality of pins includes a first end to mate with a corresponding contact of the first circuit board and a second end to mate with a corresponding one of a second plurality of contacts of the second circuit board, the second end comprising a heel portion and a toe portion extending from the heel portion in a direction toward the centerline of the slot. Other embodiments are described and claimed.

14 Claims, 6 Drawing Sheets

(56) References Cited

U.S. PATENT DOCUMENTS

| | | | | |
|---|---|---|---|---|
| 7,075,795 | B2 | 7/2006 | Naylor et al. | |
| 7,476,110 | B2 | 1/2009 | Lemke et al. | |
| 7,488,192 | B1 | 2/2009 | Eagle et al. | |
| 7,815,451 | B2 | 10/2010 | Simon et al. | |
| 8,382,487 | B2 | 2/2013 | Jeon et al. | |
| 9,966,679 | B2 * | 5/2018 | Xu | H01R 12/721 |
| 10,559,903 | B2 * | 2/2020 | Jiang | H01R 12/737 |
| 10,617,000 | B2 * | 4/2020 | Du | H05K 1/117 |
| 10,729,030 | B1 | 7/2020 | Cousineau et al. | |
| 2002/0048986 | A1 | 4/2002 | Lewis et al. | |
| 2003/0236005 | A1 | 12/2003 | Wu et al. | |
| 2005/0170697 | A1 | 8/2005 | Takada | |
| 2005/0207131 | A1 | 9/2005 | Prokofiev et al. | |
| 2005/0239301 | A1 | 10/2005 | Morana et al. | |
| 2009/0200362 | A1 | 8/2009 | Jung et al. | |
| 2011/0104913 | A1 | 5/2011 | Hinkle | |
| 2014/0291868 | A1 | 10/2014 | Lee et al. | |
| 2016/0087361 | A1 | 3/2016 | Summers et al. | |
| 2018/0351277 | A1 | 12/2018 | Beaman | |
| 2019/0037689 | A1 | 1/2019 | Du et al. | |
| 2019/0131730 | A1 | 5/2019 | Teng et al. | |
| 2020/0014136 | A1 | 1/2020 | Jiang et al. | |
| 2020/0311012 | A1 * | 10/2020 | Schaeffer | H01R 13/6683 |
| 2021/0153351 | A1 | 5/2021 | Li et al. | |
| 2021/0159625 | A1 | 5/2021 | Moon et al. | |
| 2021/0203094 | A1 | 7/2021 | Li | |
| 2021/0384659 | A1 | 12/2021 | Tower et al. | |
| 2022/0021139 | A1 | 1/2022 | Li et al. | |
| 2024/0072494 | A1 | 2/2024 | He et al. | |

FOREIGN PATENT DOCUMENTS

| | | | |
|---|---|---|---|
| JP | 2002056928 | A | 2/2002 |
| JP | 2002203624 | A | 7/2002 |
| WO | 2012138519 | A2 | 10/2012 |

OTHER PUBLICATIONS

United States Patent Office, Reply to Office Action filed Jul. 30, 2024 in U.S. Appl. No. 17/202,961 (7 pages).

United States Patent Office, Final Office Action dated Sep. 18, 2024 in U.S. Appl. No. 17/202,961 (11 pages).

United States Patent Office, Non-Final Office Action dated May 1, 2024 in U.S. Appl. No. 17/202,961 (23 pages).

European Patent Office, Search Report mailed Jul. 15, 2022 in European Patent Application No. 22156716.7 (13 pages).

Zhineng Fan, "The Evolution of CEM Connectors: Almost 20 Years in the Making," PCI-SIG, 2021, 2 pages total.

Notice of Allowance mailed Feb. 7, 2025 for U.S. Appl. No. 17/202,961, 8 pages.

* cited by examiner

600

CARD EDGE CONNECTOR INCLUDING A FLIPPED PIN FOOT ORIENTATION

TECHNICAL FIELD

Embodiments related to card edge connectors.

BACKGROUND

Data rates of electrical signals sent via Peripheral Component Interconnect Express (PCIe)-based communications in accordance with PCIe specifications have increased over time. For example, PCIe data rates have octupled from Gen3 (8 gigabits per second (Gbps)) to Gen6 (64 Gbps pulse amplitude modulation 4-level (PAM4)) in less than a decade. In many applications, desirable electrical signal integrity in platform interconnects have become increasingly stringent. Many PCIe-based communications occur between devices that are coupled together using a card edge connector, such as for example, a card electromechanical (CEM) connector. Surface mount technology (SMT) CEM connectors are often used to accommodate desirable electrical performance.

Card edge connectors typically includes two sets of pins disposed on either side of the card edge connector. The pins are used to electrically connect the card edge connector to a printed circuit board (PCB). Some card edge connectors include pins having an end that extends through the bottom of the card edge connector and includes a heel portion and a toe portion that extends from the heel portion in a direction away from a centerline of the card edge connector. In instances where congestions issues are present on the PCB, the heel portion of one or more of the pins are often coupled to heel-routed signal lines on the PCB. When a pin is coupled to a heel-routed signal line via the heel portion as opposed being coupled to a toe-routed signal line to via the toe portion, the toe portion of the pin is left floating. The floating toe portion is called a stub. The stub associated with heel-based signal routing is typically larger than a stub associated with toe-based signal routing The stub associated with heel-based signal routing may result in higher resonance and degradation in signal performance than the relatively smaller stub associated with toe-based signal routing.

DETAILED DESCRIPTION

Card edge connectors are often used to provide electrical connection between contacts of a first circuit board, such as for example, an add-in card and contacts of a second circuit board, such as for example, a motherboard of a system. An example of a card edge connector is a Peripheral Component Interconnect Express (PCIe) connector. The card edge connector includes a housing with a slot that is configured to receive the first circuit board. Two sets of pins are typically disposed on opposing sides of the slot and extend from within the slot through a bottom of the housing. Each of the pins include a first end that is configured to mate with a contact of the first circuit board disposed within the slot and a second end that is configured to mate with a contact of the second circuit board. Each of the contacts on the second circuit board are coupled to a toe-routed signal line on the second circuit board.

The second end of each of the pins includes a heel portion and a toe portion that extends from the heel portion. The first set of pins are configured in an orientation such that the toe portion of each pin extends from the heel portion in a direction away from a centerline of the slot. The second set of pins are configured in a flipped pin foot orientation where the toe portion of each pin extends from the heel portion in a direction towards the centerline of the slot.

When the card edge connector is coupled to the second circuit board, the toe portion of the second end of each of the pins is electrically coupled a toe-routed signal line via a contact on the second circuit board. A stub length associated with toe-based signal routing is relatively smaller than a stub length associated with heel-based signal routing. A card edge connector including a flipped pin orientation enables both sets of pins on opposing sides of the slot to be used for toe-based signal routing in cases where there is congestion on the second circuit board. The use of toe-based signal routing typically results in relatively lower resonance and lower degradation in signal performance than the use of heel-based signal routing in high-speed communications.

Figure 1:
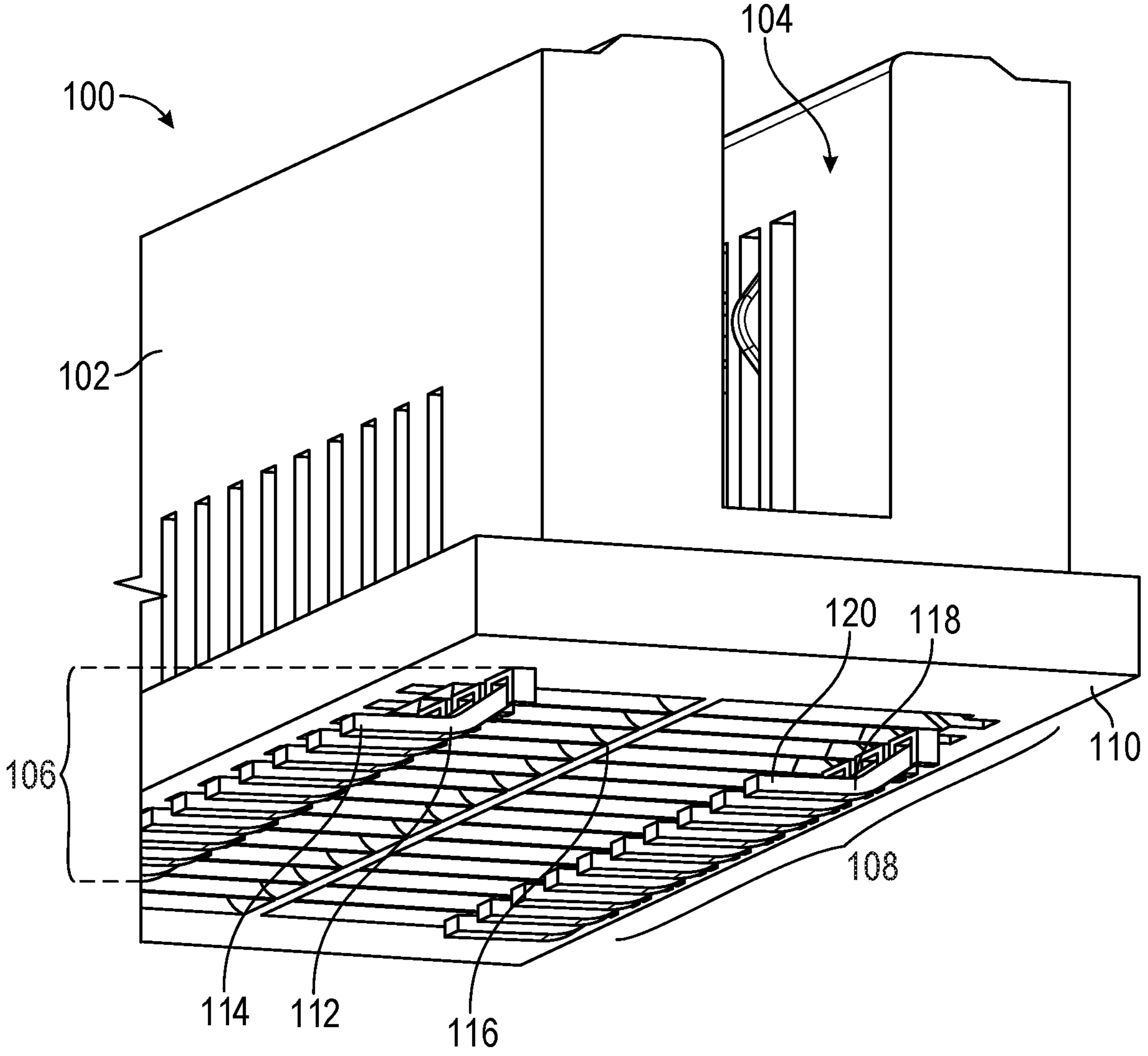
FIG. 1 is a partial view of an embodiment of a card edge connector.

Referring to FIG. 1, a partial view of an embodiment of card edge connector 100 is shown. In an embodiment, the card edge connector 100 is a Peripheral Component Interconnect Express (PCIe) connector. In an embodiment, the card edge connector 100 is a surface mount PCIe connector. In an embodiment, the card edge connector 100 is a card electromechanical (CEM) connector. In an embodiment, the card edge connector 100 is a U.2 connector in accordance with the Solid State Form Factor Working Group (SSFFWG). In an embodiment, the card edge connector 100 is a M.2 connector in accordance with the PCIe M.2 Specification Rev. 4.0 (November 2020). In an embodiment, the card edge connector 100 is a TA-1002 connector in accordance with the Storage Networking Industry Association (SNIA) Small Form Factor (SFF) Technology Work Group's SFF-TA-1002 specification. In an embodiment, the card edge connector 100 is a memory connector, such as for example, a dual inline memory module (DIMM) connector. In an embodiment, card edge connector 100 may be used in connection with solid state drives, non-volatile, and volatile memories. While a number of different types of card edge connectors have been described, alternative embodiments may include other types of card edge connectors.

The card edge connector 100 includes a housing 102, a slot 104. The slot 104 is configured to receive a first circuit board. In an embodiment, the card edge connector 100 is configured to be connected to an edge portion of a second circuit board. An example of a second circuit board is a motherboard of a system. In an embodiment, the first circuit board is a PCIe circuit board. In an embodiment, the first circuit board is an add-in card. Examples of add-in cards include, but are not limited to, a networking card of a network interface circuit (NIC), a graphics card that provides video/graphics functionality by way of one or more graphics processing units (GPUs), and an accelerator card. In alternative embodiments, the slot 104 may be configured to receive other types of first circuit boards. The first circuit board includes a plurality of contacts, such as for example, finger contacts. An example of a finger contact is a gold-plated finger contact.

The card edge connector 100 includes a first plurality of pins 106 and a second plurality of pins 108. The first and second plurality of pins 106, 108 extend from within the slot 104 through a bottom of the housing 110. Each of the first plurality of pins 106 includes a first end that is configured to mate with a corresponding contact of the first circuit board that is inserted into the slot 104 of the card edge connector 100 and a second end that extends through the bottom of the housing 110. The second end of the first plurality of pins 106 includes a heel portion 112 and a toe portion 114. The toe portion 114 extends from the heel portion 112 in a direction away from a centerline 116 of the slot 104.

Each of the second plurality of pins 108 includes a first end that is configured to mate with a corresponding contact of the second circuit board that is inserted into the slot 104 of the card edge connector 100 and a second end that extends through the bottom of the housing 110. The second end of the second plurality of pins 108 includes a heel portion 118 and a toe portion 120. The toe portion 120 extends from the heel portion 118 in a direction towards the centerline 116 of the slot 104. The second plurality of pins 108 are arranged in a flipped pin foot orientation. In an embodiment, the first plurality of pins 106 are disposed along a first side of the slot 104 and the second plurality of pins 108 are disposed along a second side of the slot 104 opposite the first side of the slot 104. In an embodiment, one of the first and second plurality of pins 106, 108 are configured to be transmit pins and the other one of the first and second plurality of pins 106, 108 are configured to be receive pins.

In alternative embodiments, the card edge connector 100 may include a fewer or greater number of first and second plurality of pins 106, 108 than shown in FIG. 1. In alternative embodiments, a first subset of the first plurality of pins 106 and a first subset of the second plurality of pins 108 may be disposed along the first side of the slot 104 and a second subset of the first plurality of pins 106 and a second subset of the second plurality of pins 108 may be disposed along the second side of the slot 104.

Figure 2:
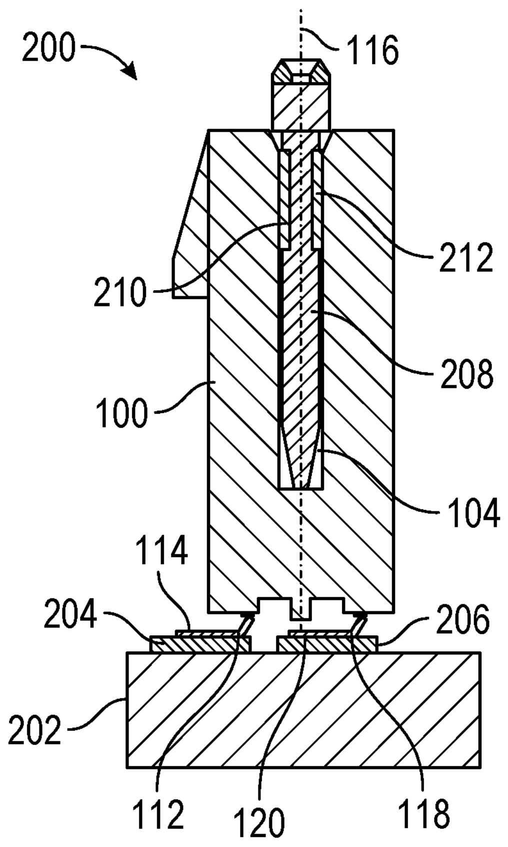
FIG. 2 is a cross-sectional partial view of a system including an embodiment of a card edge connector.

Referring to FIG. 2, a cross-sectional partial view of a system 200 including an embodiment of a card edge connector 100 is shown. The system 200 includes the card edge connector 100 electrically coupled to a second circuit board 202. In an embodiment, the second circuit board 202 is a main motherboard of the system 200. In an embodiment, the second circuit board 202 is multi-layer circuit board that includes internal routing interconnections that provide connections to one or more system components. Examples of system components include, but are not limited to, integrated circuit packages, electrical components, power supply components, and connectors. The second circuit board 202 includes a plurality of contacts 204, 206. Each of the plurality of contacts 204, 206 are connected to a corresponding toe-routed signal line on the second circuit board 202.

As mentioned above, the card edge connector 100 includes a slot 104 configured to receive the first circuit board 208. Each of the first plurality of pins 106 includes a first end that is configured to mate with a corresponding contact 210 of the first circuit board 208 and the second end including the toe portion 114 that extends from the heel portion 112 in a direction away from the centerline of the slot 116. The toe portion 114 is configured to be coupled to a corresponding contact 204 of the second circuit board 202. When the first circuit board 208 is inserted into the slot 104, one or more of the contacts 210 of the first circuit board 208 are electrically coupled to a corresponding toe-routed signal line via the toe portion 114 of one of the first plurality of pins 106 and the contact 204 on the second circuit board 202.

Each of the second plurality of pins 108 includes a first end that is configured to mate with a corresponding contact 212 of the first circuit board 208 and the second end including the toe portion 120 that extends from the heel portion 118 in a direction towards the centerline of the slot 104. The toe portion 120 is configured to be coupled a corresponding contact 206 of the second circuit board 202. When the first circuit board 208 is inserted into the slot 104, one or more of the contacts 212 of the first circuit board 208 are electrically coupled to a corresponding toe-routed signal line via the toe portion 120 of one of the second plurality of pins 108 and the contact 206 on the second circuit board 202. The system 200 enables routing of signals between components of the first circuit board 208 and components of the second circuit board 202.

Figure 3:
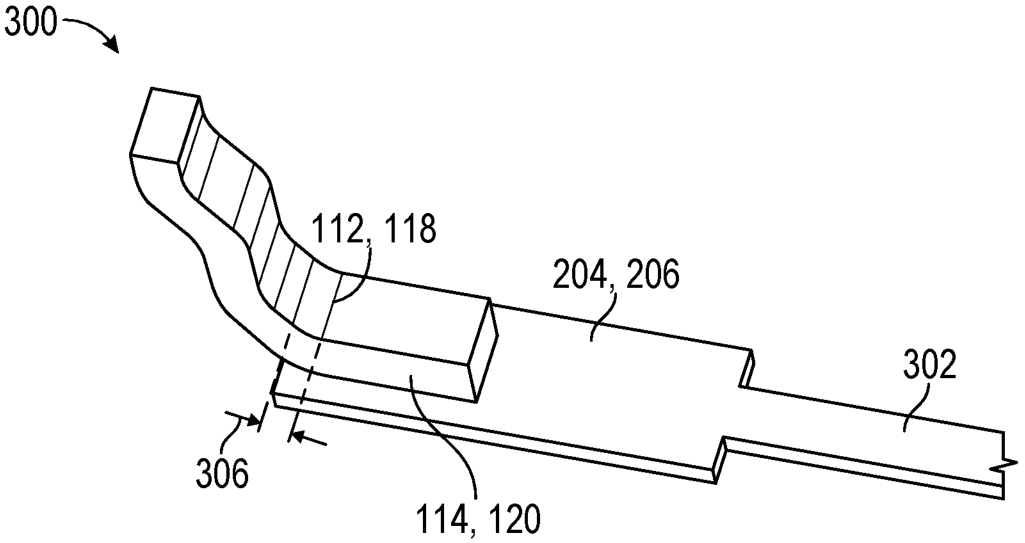
FIG. 3 is an illustration of a second end of a pin of an embodiment of a card edge connector coupled to a toe-routed signal line.

Referring to FIG. 3 an illustration of a second end of a pin 300 of an embodiment of a card edge connector 100 coupled to a toe-routed signal line 302 is shown. One or more contacts 204, 206 of the second circuit board 202 are coupled to a corresponding toe-routed signal line 302. Each of the first plurality of pins 106 and the second plurality of pins 108 includes a second end 300 configured to mate with a corresponding contact 204, 206 of the second circuit board 202. The second end 300 of each of the first plurality of pins 106 and the second plurality of pins 108 includes a heel portion 112, 118 and a toe portion 114, 120 extending from the heel portion 112, 118. The second end 300 of each of the first plurality of pins 106 and the second plurality of pins 108 are electrically coupled to a corresponding contact 204, 206 of the second circuit board 202 via the toe portion 114, 120.

A stub length 306 associated with toe-based signal routing is relatively smaller than a stub length associated with heel-based signal routing. A card edge connector 100 including a flipped pin foot orientation enables both the first plurality of pins 106 and the second plurality of pins 108 on opposing sides of the slot 104 to be used for toe-based signal routing in cases where there is congestion on the second circuit board 202. The use of toe-based signal routing typically results in relatively lower resonance and lower degradation in signal performance than the use of heel-based signal routing in high-speed communications.

Figure 4:
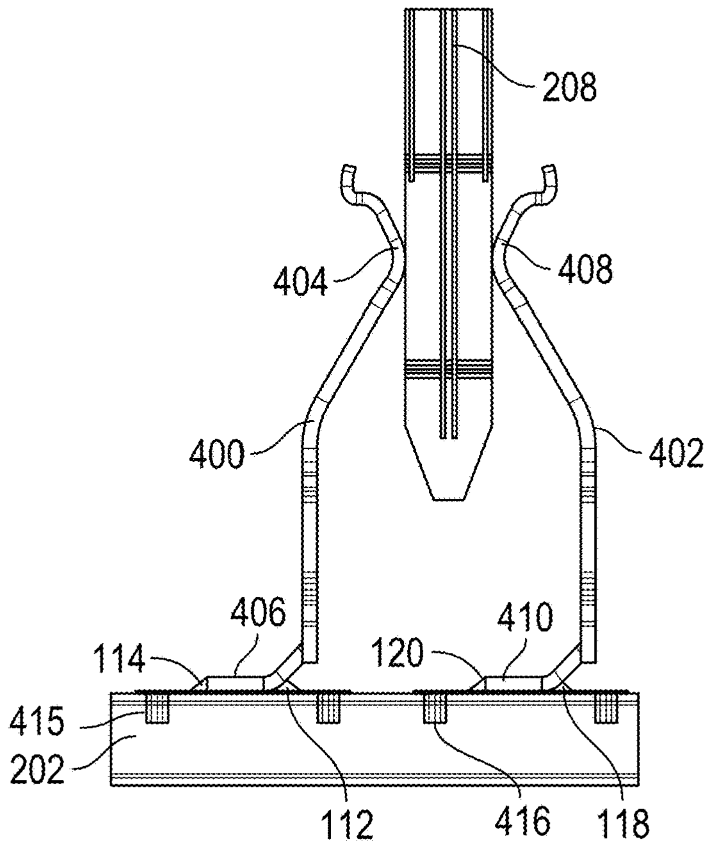
FIG. 4 is a cross-sectional view of pin orientation of a pair of pins on opposing sides of an embodiment of a card edge connector in a system.

Referring to FIG. 4 a cross-sectional view of pin orientation of a pair of pins 400, 402 on opposing sides of an embodiment of a card edge connector 100 in a system is shown. The first pin 400 is one of the first plurality of pins 106 and the second pin 402 is one of the second plurality of pins 108. The first pin 400 includes a first end 404 configured to mate with a corresponding contact 210 of the first circuit board 208 and a second end 406 configured to mate with a corresponding contact 204 of the second circuit board 202. The second end 406 includes the heel portion 112 and the toe portion 114 that extends from the heel portion 112 in a direction away from the centerline 116 of the slot 104. The second end 406 of the first pin 400 is electrically coupled to a corresponding contact 204 of the second circuit board 202 via the toe portion 114 and a cylindrical contact 415 coupled to the toe portion 114.

The second pin 402 includes a first end 408 configured to mate with a corresponding contact 212 of the first circuit board 208 and a second end 410 configured to mate with a corresponding contact 206 of the second circuit board 202. The second end 410 includes the heel portion 118 and the toe portion 120 that extends from the heel portion 118 in a direction towards the centerline 116 of the slot 104. The second end 410 of the second pin 402 is electrically coupled to a corresponding contact 206 of the second circuit board 202 via the toe portion 120 and a cylindrical contact 416 coupled to the toe portion 120.

Figure 5:
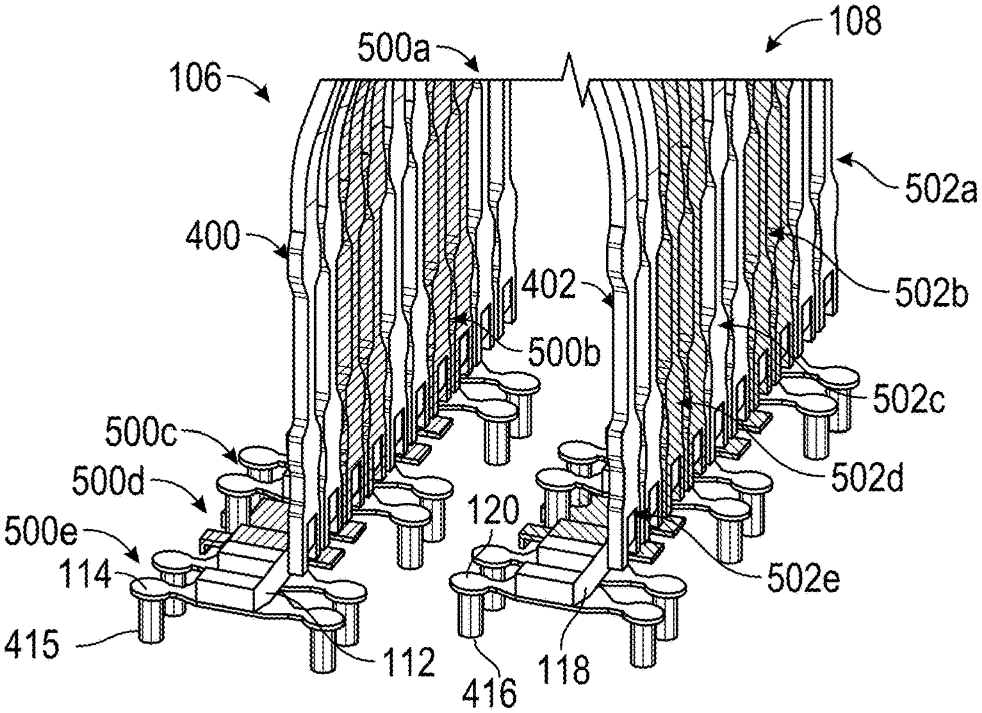
FIG. 5 is an illustration of pin orientation of a first plurality of pins and a second plurality of pins of an embodiment of a card edge connector.

Referring to FIG. 5 an illustration of pin orientation of a first plurality of pins 106 and a second plurality of pins 108 of an embodiment of a card edge connector 100 is shown. Each of the first plurality of pins 106 includes the heel portion 112 and the toe portion 114 that extends from the heel portion 112 in a direction away from the centerline 116 of the slot 104. Each of the second plurality of pins 108 includes the heel portion 118 and the toe portion 120 that extends from the heel portion 118 in a direction towards the centerline 116 of the slot 104. The second plurality of pins 108 are arranged in a flipped pin foot orientation.

In an embodiment, each of the first plurality of pins 106 includes multiple differential pairs of pins 500*a*, 500*b*, 500*c*, 500*d*. Each of the second plurality of pins 108 includes multiple differential pairs of pins 502*a*, 502*b*, 502*c*, 502*d*. The differential pin configuration that may be used in PCIe communications. In alternative embodiments, the pins may be configured to facilitate single-ended signal communication.

To understand the impact of the flipped pin foot orientation of the second plurality of pins 108 in the overall platform performance, a full link level analysis was performed in PCIe 6.0 one connector topology with 13-inch mother board routing with base spec assumptions for equalizations. Table 1 lists the eye-opening comparison of cases with toe entry and heel entry in current design and with toe entry in new design. With heel entry, the current connector makes 13-inch channel the eye spec. The eye difference between heel entry and toe entry is about 4.1 my/4.8% UI. With the flipped pin foot orientation of the second plurality of pins 108, no channel performance change was observed. Overall, surface mount card edge connectors 100 with a flipped pin foot orientation has negligible impact on PCIe 6.0 channel performance but brings routing flexibility, allows routing under the card edge connector 100 to directly connect to pin foot with toe-entry, and save routing space on the board.

TABLE 1

PCIe 6.0 eye opening example connector topology with 13-inch board routing length.

| | Bottom Eye Height (mv) | Bottom Eye Width (% UI) |
|---|---|---|
| current connector toe routing | 6.62 | 12.5 |
| current connector heel routing | 2.52 | 7.72 |
| pin foot flipped new design with toe routing | 6.68 | 12.5 |

In alternative embodiments, the flipped pin foot connector technology can be applied to card edge connectors such as for example, high speed input/output (TO) (HSIO) connectors as well such as Ethernet, Intel® Ultra Path Interconnect (UPI), universal serial bus (USB) and serial attachment technology (SATA).

The flipped pin foot orientation may be implemented in a PCIe 5.0/6.0 SMT edge connector. The connector footprint on the second circuit board 202 is be positioned to mate with the flipped pin foot orientation of the card edge connector 100. The flipped pin foot orientation of the card edge connector 100 enables an input/output (I/O) signal line on a side of the card edge connector 100 to be routed under the card edge connector 100 and directly connect to the pin foot of one of the second plurality of pins 108 with a toe entry. This may solve routing congestion problems with respect to the second circuit board 202 and reduce the space that the card edge connector 100 occupies on the second circuit board 202 while maintaining signal performance of the card edge connector 100.

In PCIe 5.0/6.0, SMT card edge connectors are often used to minimize the stub caused by long via in through hole mount (THM) connector. Heel-based signal routing typically leaves a stub length of about 1.63 mm (64 mil) while toe-based signal routing typically leaves a stub length of about 0.37 mm (15 mil). In many instances the SI performance may be significantly degraded with heel-based signal routing because a significant portion of the connector pad is not in the signal path. In PCIe 5.0/6.0, a 64 mil stub may be detrimental to signal integrity.

In many board designs of the second circuit board 202, such as for example, a half width board, a high-density small board, and a riser card design, the PCIe card edge connector is placed at the edge of a second circuit board 202, such as for example, of a motherboard, because of mechanical limitations. In addition, depending on the placement of the card edge connector, in instances where signal routing space is available, the use of heel-based signal routing may lead to lengthened signal trace routing and potentially increase the cost of PCB materials.

The use of a card edge connector 100 with a flipped foot pin orientation may address routing congestion problems on a second circuit board 202, such as for example a motherboard, and provide signal routing flexibility. In an embodiment, a first plurality of pins 106 where the toe portion 114 extends from the heel portion 112 in a direction away from the centerline of the slot, may be one of signal transmit pins and signal receive pins and a second plurality of pins 108 where the toe portion 120 extends from the heel portion 118 in a direction towards the centerline 116 of the slot 104 may be the other one of the signal transmit pins and the signal receive pins.

Figure 6:
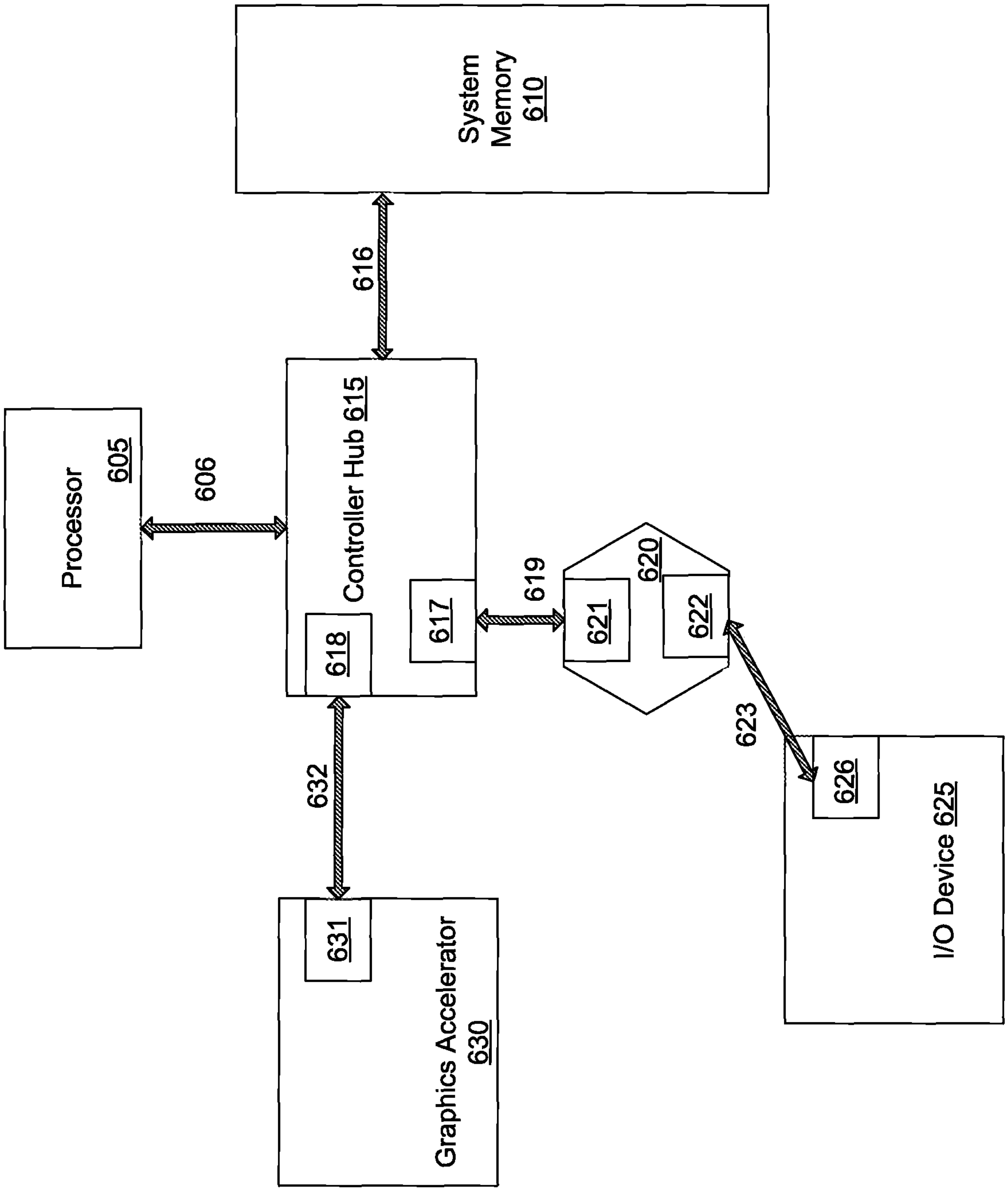
FIG. 6 is an embodiment of a fabric composed of point-to-point links that interconnect a set of components.

Embodiments may be implemented in a wide variety of interconnect structures. Referring to FIG. 6, an embodiment of a fabric composed of point-to-point links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through a link 606, such as an Intel® UPI serial point-to-point interconnect.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a PCIe interconnection hierarchy. Examples of controller hub 615 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 605, while controller hub 615 is to communicate with I/O devices, in a similar manner as described below. In some embodiments, peer-to-peer routing is optionally supported through root complex 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e., up a hierarchy towards a root complex, to controller hub 615 and downstream, i.e., down a hierarchy away from a root controller, from processor 605 or system memory 610 to device 625. Device 625 includes any internal or external device or component to be coupled to an electronic system via a card edge connector having a flipped pin foot orientation in accordance with an embodiment, such as an I/O device, a NIC, an add-in card, an audio processor, a network processor, a memory expander, a hard-drive, a storage device such as a solid state drive, a CD/DVD ROM, a monitor, a printer, a mouse, a keyboard, a router, a portable storage device, a Firewire device, a Universal Serial Bus (USB) device, a scanner, and other input/output devices. To this end, device 625 may be implemented on a circuit board to be adapted within an embodiment of a card edge connector as described herein.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. A graphics controller or the graphics accelerator 630 itself may be integrated in processor 605.

Figure 7:
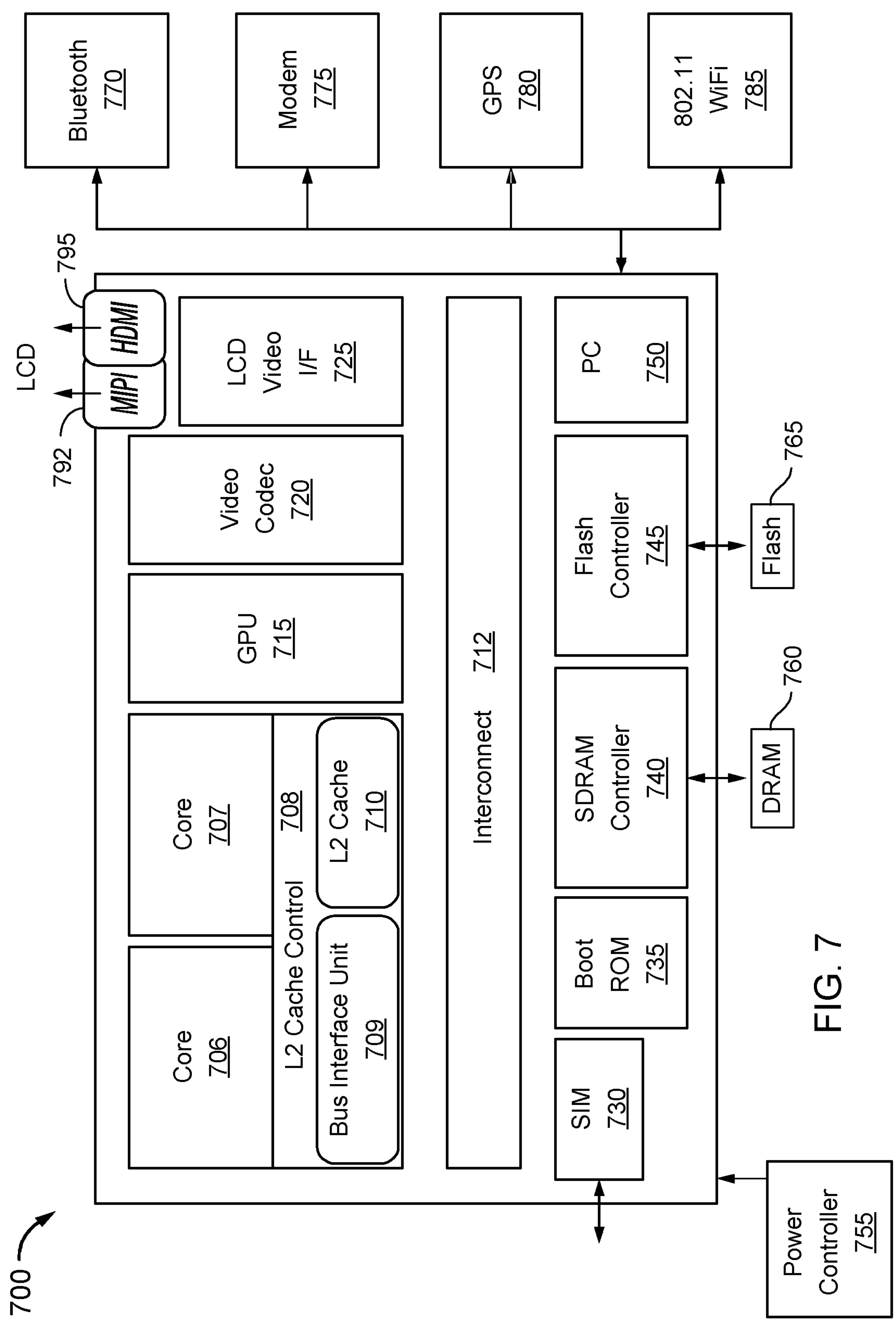
FIG. 7 is an embodiment of a system-on-chip design in accordance with an embodiment.

Turning next to FIG. 7, an embodiment of a SoC design in accordance with an embodiment is depicted. As a specific illustrative example, SoC 700 may be configured for insertion in any type of computing device, ranging from portable device to server system. Here, SoC 700 includes 2 cores 706 and 707. Cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache controller 708 that is associated with bus interface unit 709 and L2 cache 710 to communicate with other parts of system 700 via an interconnect 712.

Interconnect 712 provides communication channels to the other components, such as a Subscriber Identity Module (SIM) 730 to interface with a SIM card, a boot ROM 735 to hold boot code for execution by cores 706 and 707 to initialize and boot SoC 700, a SDRAM controller 740 to interface with external memory (e.g., DRAM 760), a flash controller 745 to interface with non-volatile memory (e.g., flash 765), a peripheral controller 750 to interface with peripherals, video codec 720 and video interface 725 to display and receive input (e.g., touch enabled input), GPU 715 to perform graphics related computations, etc. In addition, the system illustrates peripherals for communication, such as a Bluetooth module 770, 3G modem 775, GPS 780, and WiFi 785, one or more of which may be implemented on a circuit board to be adapted within the card edge connector having the flipped pin foot orientation as described herein.

Also included in the system is a power controller 755. Further illustrated in FIG. 7, system 700 may additionally include interfaces including a MIPI interface 792, e.g., to a display and/or an HDMI interface 795 also which may couple to the same or a different display.

Figure 8:
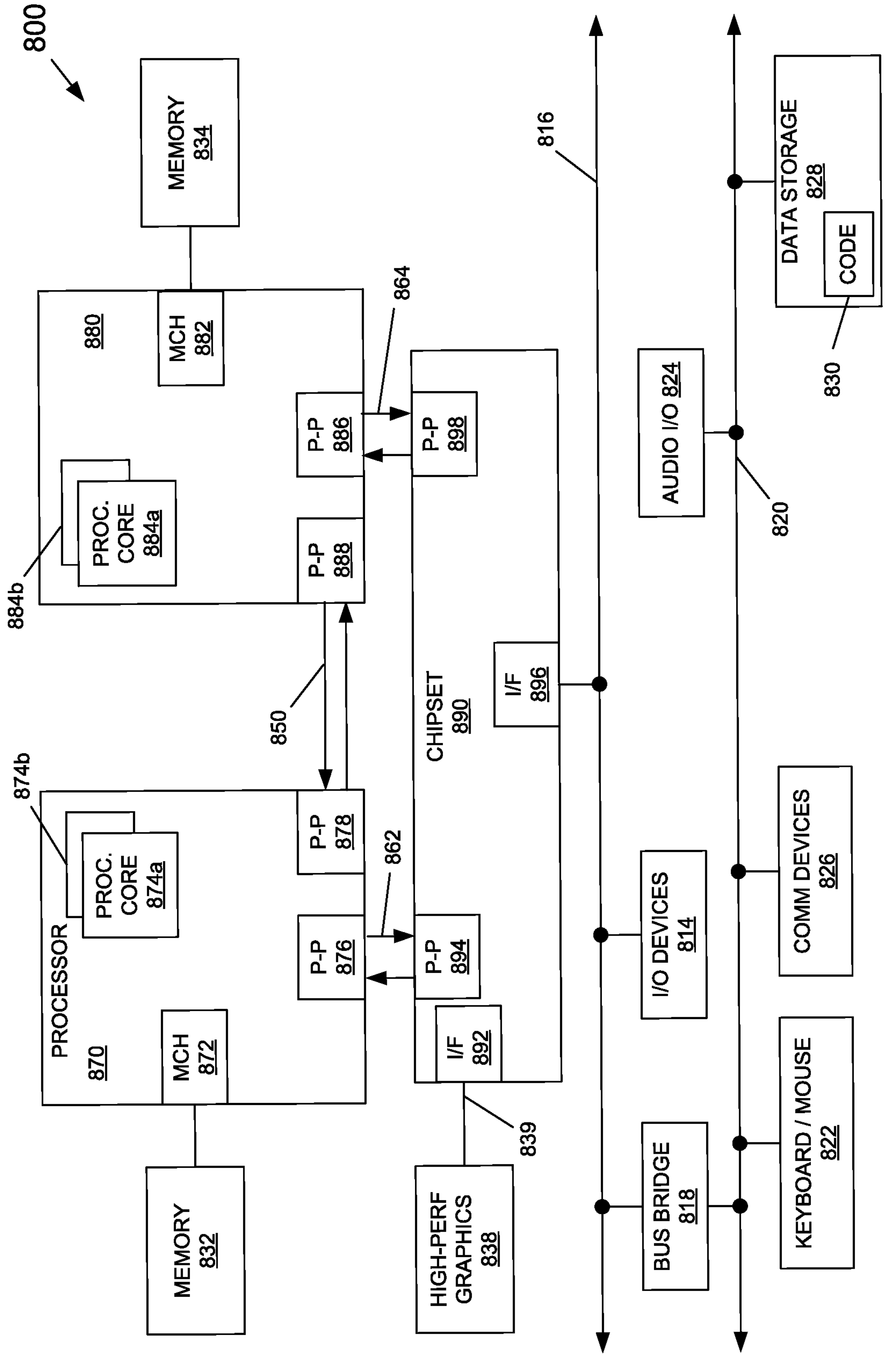
FIG. 8 is a block diagram of a system in accordance with an embodiment.

Referring now to FIG. 8, shown is a block diagram of a system in accordance with an embodiment. As shown in FIG. 8, multiprocessor system 800 includes a first processor 870 and a second processor 880 coupled via a point-to-point interconnect 850. As shown in FIG. 8, each of processors 870 and 880 may be many core processors including representative first and second processor cores (i.e., processor cores 874*a* and 874*b* and processor cores 884*a* and 884*b*).

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 862 and 864, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. As shown in FIG. 8, various input/output (I/O) devices 814 may be coupled to a first bus 816, along with a bus bridge 818 which couples first bus 816 to a second bus 820. One or more of I/O devices 814 may be implemented on a circuit board to be adapted within a card edge connector having a flipped pin foot orientation as described herein.

Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820.

The following examples pertain to further embodiments.

In one example, a card edge connector includes: a housing including a slot to receive a first circuit board; a first plurality of pins extending from within the slot through a bottom of the housing, each of the first plurality of pins comprising a first end to mate with a corresponding contact of the first circuit board and a second end to mate with a corresponding one of a first plurality of contacts of a second circuit board, the second end comprising a heel portion and a toe portion extending from the heel portion in a direction away from a centerline of the slot; and a second plurality of pins extending from within the slot through the bottom of the housing, each of the second plurality of pins comprising a first end to mate with a corresponding contact of the first circuit board and a second end to mate with a corresponding one of a second plurality of contacts of the second circuit board, the second end comprising a heel portion and a toe portion extending from the heel portion in a direction toward the centerline of the slot.

In an example, the first plurality of pins are disposed along a first side of the slot and the second plurality of pins are disposed along a second side of the slot opposite the first side of the slot.

In an example, the card edge connector includes a Peripheral Component Interconnect Express (PCIe) connector to receive the first circuit board comprising a PCIe circuit board.

In an example, the card edge connector is to be connected to an edge portion of the second circuit board.

In an example, each of the first and second plurality of contacts of the second circuit board are connected to a corresponding toe-routed signal line and each of the first and second plurality of pins are to be coupled to the corresponding toe-routed signal line via the toe portion and the corresponding one of the first and second plurality of contacts of the second circuit board.

In an example, the card edge connector is to enable communication between at least one memory device adapted to the first circuit board and a processor adapted to the second circuit board.

In an example, the first plurality of pins are one of a plurality of transmit pins and a plurality of receive pins and the second plurality of pins are the other one of the plurality of transmit pins and the plurality of receive pins.

In one example, a system includes: a first circuit board including: a processor; first and second plurality of contacts on a surface of the first circuit board; one or more signal lines to couple the processor to one or more of the first and second plurality of contacts; and a card edge connector. The card edge connector includes: a housing including a slot to receive a second circuit board; a first plurality of pins extending from within the slot through a bottom of the housing, each of the first plurality of pins comprising a first end to mate with a corresponding contact of the second circuit board and a second end to mate with a corresponding one the first plurality of contacts of the first circuit board, the second end comprising a heel portion and a toe portion extending from the heel portion in a direction away from a centerline of the slot; and a second plurality of pins extending from within the slot through a bottom of the housing, each of the second plurality of pins comprising a first end to mate with a corresponding contact of the second circuit board and a second end to mate with a corresponding one of the second the plurality of contacts of the first circuit board, the second end comprising a heel portion and a toe portion extending from the heel portion in a direction toward the centerline of the slot.

In an example, each of the first and second plurality of contacts comprises a conductive pad having a first end and a second end, the second end of the first plurality of conductive pads disposed in a direction away from the centerline of the slot with respect to the first end and the second end of the second plurality of conductive pads disposed in a direction towards the centerline of the slot with respect to the first end.

In an example, the second plurality of contacts are disposed on the surface of an edge portion of the first circuit board.

In an example, one or more memory devices are adapted to the second circuit board.

In an example, the card edge connector is to communicate signals at one of a data rate of at least 32 gigabits per second and a data rate of at least 64 gigabits per second.

In an example, the card edge connector is a surface mount Peripheral Component Interconnect Express (PCIe) connector and the second circuit board is a PCIe circuit board.

In an example, the second circuit board is a network interface circuit.

In an example, each of the first and second plurality of pins are to be coupled to a corresponding signal line via the toe portion and a corresponding one of the first and second plurality of contacts of the second circuit board.

In an example, the first circuit board is one of a half width board, high density small board, and a riser card.

In one example, a card electromechanical (CEM) connector includes: a housing comprising a slot into to receive a first circuit board; a first plurality of pins extending from within the slot through a bottom of the housing, each of the first plurality of pins comprising a first end to mate with a corresponding contact of the first circuit board and a second end to mate with a corresponding one of a first plurality of conductive pads of a motherboard, the second end comprising a heel portion and a toe portion extending from the heel portion in a direction away from a centerline of the slot; and a second plurality of pins extending from within the slot through the bottom of the housing, each of the second plurality of pins comprising a first end to mate with a corresponding contact of the first circuit board and a second end to mate with a corresponding one of a second plurality of conductive pads of the motherboard, the second end comprising a heel portion and a toe portion extending from the heel portion in a direction toward the centerline of the slot.

In an example, the CEM connector is a Peripheral Component Interconnect Express (PCIe) connector to receive the first circuit board comprising a PCIe circuit board.

In an example, each of the first and second plurality of conductive pads of the motherboard are connected to a corresponding toe-routed signal line and each of the first and second plurality of pins are to be coupled to the corresponding toe-routed signal line via the toe portion and the corresponding one of the first and second plurality of conductive pads of the motherboard.

In an example, the first plurality of pins are disposed along a first side of the slot and the second plurality of pins are disposed along a second side of the slot opposite the first side.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. While an embodiment of a communication device has been described, alternative embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While a limited number of embodiments have been described, those skilled in the art will appreciate numerous modifications and variations therefrom. It is intended that the appended claims cover all such modifications and variations.

What is claimed is:

1. A card edge connector comprising:

a housing comprising a slot to receive a first circuit board;

a first plurality of pins extending from within the slot through a bottom of the housing, each of the first plurality of pins comprising a first end to mate with a corresponding contact of the first circuit board and a second end comprising a respective toe portion and a cylindrical contact coupled to the respective toe portion to mate with a corresponding one of a first plurality of contacts of a second circuit board in a through-hole mount, and a respective heel portion, the respective toe portion extending from the respective heel portion in a direction away from a centerline of the slot; and a second plurality of pins extending from within the slot through the bottom of the housing, each of the second plurality of pins comprising a first end to mate with a corresponding contact of the first circuit board and a second end comprising a respective toe portion and a cylindrical contact coupled to the respective toe portion to mate with a corresponding one of a second plurality of contacts of the second circuit board in a through-hole mount, and a respective heel portion, wherein the respective toe portion extends from the respective heel portion of each of the second plurality of pins in a direction toward the centerline of the slot, wherein for the first and second pluralities of pins, a stub length of the corresponding contact of the second circuit board extends past the heel portion.

2. The card edge connector of claim 1, wherein the first plurality of pins are disposed along a first side of the slot and the second plurality of pins are disposed along a second side of the slot, opposite the first side of the slot.

3. The card edge connector of claim 1, wherein the card edge connector comprises a Peripheral Component Interconnect Express (PCIe) connector to receive the first circuit board, and the first circuit board comprises a PCIe circuit board.

4. The card edge connector of claim 1, wherein each of first and second plurality of contacts of the second circuit board are connected to a corresponding toe-routed signal line and each of the first and second plurality of pins are to be coupled to the corresponding toe-routed signal line via the toe portion.

5. The card edge connector of claim 1, wherein the card edge connector is to enable communication between at least one memory device adapted to the first circuit board and a processor adapted to the second circuit board.

6. The edge card connector of claim 1, wherein the first plurality of pins are one of a plurality of transmit pins and a plurality of receive pins and the second plurality of pins are the other one of the plurality of transmit pins and the plurality of receive pins.

7. The card edge connector of claim 1, wherein:

the first plurality of pins comprises consecutive adjacent pairs of pins with the toe portion extending from the heel portion in the direction away from a centerline of the slot; and the second plurality of pins comprises consecutive adjacent pairs of pins with the toe portion extending from the heel portion in the direction toward the centerline of the slot.

8. A system comprising:

a motherboard comprising:

a processor;

a first and second plurality of contacts on a surface of the motherboard; and one or more signal lines to couple the processor to one or more of the first and second plurality of contacts; and a card edge connector comprising:

a housing including a slot to receive a circuit board;

a first plurality of pins extending from within the slot through a bottom of the housing, each of the first plurality of pins comprising a first end to mate with a corresponding contact of the circuit board and a second end comprising a respective toe portion and a cylindrical contact coupled to the respective toe portion to mate with a corresponding one the first plurality of contacts of the motherboard in a through-hole mount, and a respective heel portion, the respective toe portion extending from the respective heel portion in a direction away from a centerline of the slot; and a second plurality of pins extending from within the slot through the bottom of the housing, each of the second plurality of pins comprising a first end to mate with a corresponding contact of the circuit board and a second end comprising a respective toe portion and a cylindrical contact coupled to the respective toe portion to mate with a corresponding one of the second plurality of contacts of the motherboard in a through-hole mount, and a respective heel portion, wherein the toe portion extends from the respective heel portion in a direction toward the centerline of the slot, wherein for the first and second pluralities of pins, a stub length of the corresponding contact of the motherboard extends past the heel portion.

9. The system of claim 8, wherein the card edge connector comprises a surface mount Peripheral Component Interconnect Express (PCIe) connector and the circuit board comprises a PCIe circuit board.

10. The system of claim 8, wherein each of first and second plurality of pins are to be coupled to a corresponding signal line via the toe portion and a corresponding one of the first and second plurality of contacts of the circuit board.

11. The system of claim 8, wherein the motherboard comprises one of a half width board, high density small board, or a riser card.

12. A card electromechanical connector comprising:

a housing comprising a slot to receive a first circuit board;

a first plurality of connectors extending from within the slot through a bottom of the housing, each of the first plurality of connectors comprising a first end to mate with a corresponding contact of the first circuit board and a second end to mate with a corresponding one of a first plurality of conductive pads of a motherboard, the second end comprising a heel portion and a toe portion extending from the heel portion in a direction away from a centerline of the slot; and a second plurality of connectors extending from within the slot through the bottom of the housing, each of the second plurality of connectors comprising a first end to mate with a corresponding contact of the first circuit board and a second end to mate with a corresponding one of a second plurality of conductive pads of the motherboard, the second end comprising a heel portion and a toe portion extending from the heel portion in a direction toward the centerline of the slot, wherein for the first and second pluralities of connectors, a stub length of the corresponding conductive pad of the motherboard extends past the heel portion.

13. The card electromechanical connector of claim 12, wherein the card electromechanical connector comprises a Peripheral Component Interconnect Express (PCIe) connector to receive the first circuit board comprising a PCIe circuit board.

14. The card electromechanical connector of claim 12, wherein each of the first and second plurality of conductive pads of the motherboard are connected to a corresponding toe-routed signal line and each of the first and second plurality of connectors are to be coupled to the corresponding toe-routed signal line via the toe portion and the corresponding one of the first and second plurality of conductive pads of the motherboard.

* * * * *